United States Patent [19]

Schimmel et al.

[11] Patent Number: 4,460,549

[45] Date of Patent: Jul. 17, 1984

[54] RECOVERY OF URANIUM FROM WET-PROCESS PHOSPHORIC ACID

[75] Inventors: Günther Schimmel, Erftstadt; Reinhard Gradl, Hürth; Gero Heymer, Erftstadt, all of Fed. Rep. of Germany

[73] Assignee: Hoechst Aktiengesellschaft, Fed. Rep. of Germany

[21] Appl. No.: 229,978

[22] Filed: Jan. 30, 1981

[30] Foreign Application Priority Data

Feb. 9, 1980 [DE] Fed. Rep. of Germany ....... 3004925

[51] Int. Cl.³ .............................................. C01G 43/00
[52] U.S. Cl. ........................................... 423/10; 423/8
[58] Field of Search ...................................... 423/8, 10

[56] References Cited
U.S. PATENT DOCUMENTS 2,859,094  11/1958  Schmitt et al. ...................... 423/10
3,880,980   4/1975  Wamser ................................. 423/8
3,937,783   2/1976  Wamser et al. ....................... 423/8
3,965,238   6/1976  Tabata et al. ......................... 423/8
4,233,278  11/1980  Korchnak ............................... 423/8
4,243,637   6/1981  Bradford et al. ...................... 423/8

*Primary Examiner*—Edward A. Miller
*Attorney, Agent, or Firm*—Connolly and Hutz

[57] ABSTRACT

The present invention relates to a process for recovering uranium from raffinate which is obtained by extracting phosphoric acid from a uranium-containing wet-process phosphoric acid with the aid of organic extractants and separating the resulting organic phosphoric acid extract from residue not taken up by the extract. To this end, the raffinate residue is subjected to thermal treatment and thereby freed from dissolved or emulsified residual extractant. Next, the raffinate is treated with a water-immiscible solvent to extract the uranium, and the extracted uranium is separated from the undissolved raffinate portion.

5 Claims, No Drawings

RECOVERY OF URANIUM FROM WET-PROCESS PHOSPHORIC ACID

The present invention relates to a process for recovering uranium from raffinate which is obtained by extracting phosphoric acid from wet-process phosphoric acid containing uranium, the extraction being effected in the presence of a mineral acid and with the aid of one or more organic solvents which are immiscible or only partially miscible with water. The residue which remains after separation of the resulting organic phosphoric acid extract is customarily termed "raffinate".

Wet-process phosphoric acid is produced by subjecting phosphate minerals to treatment with a mineral acid, preferably sulfuric acid, precipitated calcium sulfate being separated by filtration. Phosphoric acid which is so made has the bulk of cationic contaminants originating from the phosphate dissolved therein, inter alia uranium, in a proportion within the range 100 to 400 ppm, based on $P_2O_5$, depending on the origin of the phosphate mineral used in each particular case.

Various processes, which provide for uranium that is dissolved in wet-process phosphoric acid with about 30 weight% $P_2O_5$ to be extracted into the organic phase by subjecting the phosphoric acid to multiple stage countercurrent extraction with the use of a solvent mixture, which is immiscible with water and normally consists of a hydrocarbon, such as kerosene, a dialkylphosphoric acid ester, such as di(ethylhexyl)phosphate (DEHPA) and a trialkylphosphine oxide, such as tri-n-octylphosphine oxide (TOPO) have already been described. The principles underlying these processes have been described under the title of: "Solvent Extraction of Uranium from Wet-Process Phosphoric Acid" in ORNL-Report TM-2522, April 1969 and also in U.S. Pat. Nos. 2,859,092 and 2,859,094, for example.

Common to these prior processes is a series of adverse effects: As a result of the low concentration of uranium in the phosphoric acid and the high $P_2O_5$-content of about 30 weight%, which incidentally strongly impairs the extraction yield, it is only possible, even by a 4–6 stage extraction, in the extract phase to concentrate just 2–3 times more uranium than in the carrier phase. In addition to this, the high concentration of iron in the phosphoric acid (about 0.5% Fe/$P_2O_5$) results in considerable proportions of the iron contaminants going forward into the organic phase, despite the relatively low distribution coefficient (cf. Example 7 hereinafter).

Needless to say also that the organic contaminants in crude wet-process phosphoric acid inter alia affect the extraction of uranium.

These are the reasons why attempts have already been made (cf. U.S. Pat. No. 3,880,980) to subject crude wet-process phosphoric acid (10–30 weight% $H_3PO_4$) obtained by processing phosphate ore with hydrochloric acid, to treatment with an organic solvent so as to first extract the phosphoric acid therefrom.

During the extraction, the phosphoric acid goes into the organic phase, the uranium being retained in the aqueous raffinate phase, from which it can be recovered in the form of a complex with chlorine by anion exchange in a solid bed. In order to prevent uranium from going forward into the organic phase during phosphoric acid extraction, it is necessary for it to be converted by means of a suitable reductant to the tetravalent stage and to be reoxidized prior to having it adsorbed by the ion exchanger. In this manner, it is possible by elution of the anion exchanger to obtain an aqueous solution containing at most 0.7 weight% of uranium.

The present invention now unexpectedly provides a process permitting the extraction of uranium from wet-process phosphoric acid to be considerably improved and simplified, which provides for an aqueous sulfuric acid-containing residue which originates from phosphoric acid extraction, i.e. so-called raffinate, to be used as starting material replacing the crude phosphoric acid used heretofore. More particularly, the uranium is completely taken up by the extractant at an extremely small solvent phase/carrier phase-ratio and minimum number of extraction stages, a maximum of pure uranium being obtained after the prior separation, equally in high yields, of the phosphoric acid contained in wet-process phosphoric acid.

The present process comprises more particularly: subjecting the raffinate residue to thermal treatment and thereby freeing it from dissolved or emulsified residual extractant, treating the raffinate with a water-immiscible solvent for uranium and thereby extracting the uranium, and separating the extracted uranium from the undissolved raffinate portion.

A preferred feature of the invention provides for the raffinate, prior to thermal treatment thereof, to contain at most 10 weight% of $P_2O_5$, 5 to 50 weight%, preferably 10 to 30 weight%, of sulfuric acid, and 0.1 to 5 weight%, preferably 0.5 to 2 weight%, of dissolved or emulsified organic extractant.

A further preferred feature provides for the raffinate to be thermally treated by stripping it with steam. The useful solvents for uranium comprise all those which are customarily used for this purpose, e.g. dialkylphosphoric acid esters and trialkylphosphine oxides, which should be used in the form of a solution in water-immiscible organic solvents.

It is more particularly good practice to use di(ethylhexyl) phosphate and tri-n-octylphosphine oxide dissolved in kerosene, and solutions which, per liter of kerosene, normally contain between 0.1 to 0.5 mol of di(ethylhexyl) phosphate and/or 0.01 to 0.2 mol of tri-n-octylphosphine oxide.

It is particularly advantageous in accordance with this invention to use a raffinate which is based on wet-process phosphoric acid containing 40 to 55 weight% $P_2O_5$, and has been obtained by extracting the acid with a $C_5$-alcohol in an extraction zone comprising n stages, where n is equal to or greater than 5, the extraction being effected by admixing the acid in one of the stages $n=4$ to $(n-1)$ with 2 to 20 weight%, based on $P_2O_5$, sulfuric acid, and the $C_5$-alcohol and sulfuric acid being caused to flow countercurrently with respect to the phosphoric acid, 2.5 to 5.5 parts by volume of anhydrous $C_5$-alcohol or 6.0 to 8.2 parts by volume of water-saturated $C_5$-alcohol being used per part by volume of phosphoric acid.

The present process gives a uranium extract from which uranium can be separated in customary manner, e.g. by re-extracting it with an ammonium carbonate solution and separating it in the form of solid ammonium uranyltricarbonate.

The processing steps taken in accordance with this invention would not have been expected by the skilled artisan to result in the uranium being extracted practically completely with the use of a minimum of extractant from phosphoric acid raffinate left untreated with any oxidant or reductant. In order successfully to effect the extraction, it is just necessary to use the uranium extractant and raffinate in a volume ratio of less than 1:5, preferably in a volume ratio within the range 1:10 to 1:30. In view of this small volume ratio, it is all the more an unexpected result that the extract contains uranium in the high concentration of between about 0.2 to 1.4 weight%, for a low concentration of iron of about 100 to 800 ppm therein. As a result, it is possible for the uranium to be extracted from raffinate in a 2–4 stage countercurrent mixer-settler at a volume ratio of solvent to raffinate smaller than 1:5, 10 to 30 times more uranium than heretofore being concentrated in the organic phase.

The technically beneficial effects which are associated with the present process for extracting uranium from wet-process phosphoric acid can be summarized as follows:

(1) The extractive decontamination of wet-processed phosphoric acid described hereinabove gives feed raffinate in which 3 to 5 times more uranium is concentrated than in crude phosphoric acid containing about 30 weight% of $P_2O_5$. Needless to say, correspondingly reduced volumes of material are required to be used for extraction of the uranium which can be extracted in apparatus with dimensions considerably smaller than heretofore.

(2) The uranium-containing raffinate is free from emulsion-forming organic ingredients.

(3) The removal of residual solvent from the raffinate results in the total uranium present therein being converted to readily extractible material.

(4) As a result of the low $P_2O_5$-content and the high $SO_4$-content of the raffinate used in accordance with this invention, the extraction yield of uranium in a 2–4 stage mixer-settler is practically quantitative, even in the event of the raffinate/solvent-phase ratio being greater than 10:1.

(5) The extract phase is extremely pure, especially as regards the presence of iron ions therein. In other words, the extraction is highly selective.

The following Examples illustrate the invention which is naturally not limited thereto.

Morocco phosphate was processed with sulfuric acid and wet-process phosphoric acid composed as follows:

| | |
|---|---|
| $P_2O_5$ | 48.3 weight % |
| Fe | 0.2 weight % |
| Al | 0.12 weight % |
| Mg | 0.42 weight % |
| F | 0.43 weight % |
| V | 185 ppm |
| U | 117 ppm |
| $SO_4$ | 0.31 weight % | was obtained.

1 l/h of the crude acid and 250 ml/h of recycled scrubbing solution were extracted in an 8-stage countercurrent apparatus with 6 l/h of hydrous n-amyl alcohol; the aqueous phase was placed in the mixing zone and the organic phase was dispersed therein.

A further 58 ml/h of concentrated sulfuric acid was admitted at the level of the 6th stage.

635 g/h of raffinate remained behind. It had the following composition. The loss of material, based on $P_2O_5$ in the crude acid, was 5.0%.

The raffinate was composed as follows:

| | |
|---|---|
| $P_2O_5$ = 6.0 weight % | F = 0.6 weight % |
| Fe = 0.5 weight % | V = 460 ppm |
| Al = 0.3 weight % | U = 290 ppm |
| Mg = 1.0 weight % | $SO_4$ = 15.9 weight % |
| amyl alcohol = 0.4 weight %. | |

EXAMPLES 1 TO 5

The raffinate described was preheated to a temperature higher than 70° C. and 2.0 l/h thereof was pumped into the head portion of a heated jacketed steel column, which had an internal diameter of 35 mm, an effective height of 1 m and was packed with Raschig rings. By means of released steam at about 100° C., which was introduced into the bottom portion of the column, the raffinate was stripped countercurrently, at atmospheric pressure and 2.0 l/h of stripped raffinate was taken from the column bottom portion. The alcohol content was found to have been reduced to less than 50 ppm (limit of detection). The other ingredients of the raffinate were found to have been retained therein in the proportions indicated above.

The raffinate so treated was admixed with varying quantities of a solution of di(ethylhexyl)phosphate (DEHPA) and tri-n-octyl phosphine oxide (TOPO) in kerosene and the whole was intensively stirred for 15 minutes at room temperature. Next, the distribution coefficient for uranium Ea (=quotient of uranium concentration in extract phase and carrier phase) and the extraction yield were determined analytically.

EXAMPLE 6

(Comparative Example)

The procedure was as in Examples 1 to 5, but unstripped raffinate was used.

EXAMPLE 7

(Comparative Example)

The procedure was as in Examples 1 to 6, but the raffinate was replaced by green crude phosphoric acid (originating from Morocco) with 30 weight% $P_2O_5$ therein and the following analytical data:

| | |
|---|---|
| $SO_4$ = 0.2 weight % | Fe = 0.14 weight % |
| F = 0.2 weight % | U = 0.008 weight % |

The results obtained in Examples 1 to 7 are indicated in the following Table.

TABLE 1

| Example No. | A:O (Vol.) | Concentration in mol/l kerosene solution | | | Distribution coefficient Ea | | Extraction yield in (%) | |
|---|---|---|---|---|---|---|---|---|
| | | DEHPA | TOPO | DEHPA + TOPO | U | Fe | U | Fe |
| 1 | 5:1 | 0.16 | 0.04 | 0.2 | 85.9 | 0.2 | 94.5 | 3.9 |
| 2 | 10:1 | 0.175 | 0.05 | 0.225 | 49.2 | 0.09 | 83.1 | 0.9 |
| 3 | 10:1 | 0.2 | 0.05 | 0.25 | 61.4 | 0.08 | 86.0 | 0.8 |
| 4 | 10:1 | 0.26 | 0.1 | 0.36 | 97.5 | not identified | 90.7 | not identified |

TABLE 1-continued

| Example No. | A:O (Vol.) | Concentration in mol/l kerosene solution | | | Distribution coefficient Ea | | Extraction yield in (%) | |
|---|---|---|---|---|---|---|---|---|
| | | DEHPA | TOPO | DEHPA + TOPO | U | Fe | U | Fe |
| 5 | 20:1 | 0.175 | 0.075 | 0.25 | 39.0 | 0.08 | 66.1 | 0.4 |
| 6 | 5:1 | 0.16 | 0.04 | 0.2 | 1.4 | not identified | 22.4 | not identified |
| 7 | 10:1 | 0.2 | 0.05 | 0.25 | 1.9 | 0.17 | 15.8 | 1.7 |

A = Raffinate
O = Extract

EXAMPLES 8 AND 9

The procedure in Examples 1 to 5 was modified and the raffinate was extracted countercurrently in a 2-4 stage mixer-settler which was fed per hour with the quantity of raffinate indicated in the following Table 2 and in each case with 100 ml/h of organic phase (0.2 mol DEHPA and 0.05 mol TOPO in kerosene). The following concentrations were determined for the extract phase and the extraction yields resulting therefrom.

TABLE 2

| Example | Number of stages | Raffinate ml/h | Concentration in extract | | Extraction yield (%) | |
|---|---|---|---|---|---|---|
| | | | U | Fe | U | Fe |
| 8 | 2 | 1000 | 0.43 | 0.07 | 98.7 | 0.9 |
| 9 | 4 | 2000 | 0.83 | 0.025 | 95.2 | 0.2 |

EXAMPLES 10 AND 11

The extract of Example 9, which contained 350 ppm of $H_3PO_4$ was scrubbed countercurrently in a 2-stage mixer-settler first with pure phosphoric acid (30 weight% $P_2O_5$) to remove iron therefrom, and then with water to remove the phosphoric acid. The iron and phosphoric acid concentrations were found to decrease as follows:

TABLE 3

| Example | A:O (Vol) | Concentration in extract (ppm) | | Decrease in concentration (%) | |
|---|---|---|---|---|---|
| | | $H_3PO_4$ | Fe | $H_3PO_4$ | Fe |
| 10 | 1:20 | 1010 | 20 | — | 92 |
| 11 | 1:4 | 40 | 19 | 96 | — |

A = aqueous phase;
O = organic phase

EXAMPLE 12

The scrubbed extract was extracted twice countercurrently with a 2 m ammonium carbonate solution in a phase ratio of 15:1. The uranium was reextracted almost quantitatively and obtained in the form of ammonium uranyltricarbonate (AUT). The reextracted extract contained 79 ppm of uranium, i.e. the reextraction yield was 99%. The content of iron in AUT, based on uranium, was less than 0.3%.

We claim:

1. In the process for recovering uranium from uranium-containing crude wet process phosphoric acid, by extracting phosphoric acid from said wet process phosphoric acid with an organic extractant for phosphoric acid which is immiscible or only partially miscible with water, with the resultant formation of two liquid phases including an organic phosphoric acid extract and a raffinate residue and separating the two phases, the improvement which comprises: heating said separated raffinate residue to a temperature sufficient to expel dissolved or emulsified residual extractant from said raffinate residue, extracting thereafter the uranium from the raffinate residue with a water-immiscible solvent extractant for uranium, and separating the resulting uranium-containing extract from the undissolved raffinate portion.

2. The process as claimed in claim 1, wherein the raffinate residue, before heating contains at most 10 weight% of $P_2O_5$, 5 to 50 weight% of sulfuric acid and 0.1 to 5 weight% of dissolved or emulsified organic extractant.

3. The process as claimed in claim 1, wherein the heating step comprises stripping with steam.

4. The process as claimed in claim 1, wherein the water-immiscible solvent extractant for extracting the uranium is a solution of a dialkylphosphoric acid ester or of trialkyl phosphine oxide or of a mixture of a dialkylphosphoric acid ester and trialkylphosphine oxide in an organic solvent which is immiscible with water.

5. The process as claimed in claim 4, wherein the organic solvent extractant for uranium comprises di(ethylhexyl)phosphate, tri-n-octylphosphine oxide, and kerosene.

* * * * *